United States Patent
Kliper

(10) Patent No.: US 10,460,286 B2
(45) Date of Patent: Oct. 29, 2019

(54) INVENTORY MANAGEMENT SYSTEM AND METHOD THEREOF

(71) Applicant: The Joan and Irwin Jacobs Technion-Cornell Innovation Institute, New York, NY (US)

(72) Inventor: Roi Kliper, New York, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 482 days.

(21) Appl. No.: 14/940,396

(22) Filed: Nov. 13, 2015

(65) Prior Publication Data

US 2016/0140490 A1 May 19, 2016

Related U.S. Application Data

(60) Provisional application No. 62/079,804, filed on Nov. 14, 2014, provisional application No. 62/147,771, filed on Apr. 15, 2015.

(51) Int. Cl.
*G06Q 20/12* (2012.01)
*G06Q 10/08* (2012.01)
*G06N 7/00* (2006.01)
*G06Q 20/20* (2012.01)

(52) U.S. Cl.
CPC ............ *G06Q 10/087* (2013.01); *G06N 7/005* (2013.01); *G06Q 20/12* (2013.01); *G06Q 20/20* (2013.01); *G06Q 20/202* (2013.01)

(58) Field of Classification Search
None
See application file for complete search history.

(56) References Cited

U.S. PATENT DOCUMENTS

| | | |
|---|---|---|
| 6,326,988 B1 | 12/2001 | Gould et al. |
| 6,868,525 B1 | 3/2005 | Szabo |
| 7,010,577 B1 | 3/2006 | Philyaw et al. |
| 7,027,999 B2 * | 4/2006 | Smith .............. G06Q 10/06375 705/7.31 |
| 7,685,192 B1 | 3/2010 | Scofield et al. |
| 7,975,019 B1 | 7/2011 | Green et al. |
| 8,170,927 B2 * | 5/2012 | Godlewski ......... G06Q 30/0635 700/216 |
| 8,244,590 B2 | 8/2012 | Rothman |
| 8,352,869 B2 | 1/2013 | Melcher et al. |
| 8,401,911 B1 | 3/2013 | Chu et al. |

(Continued)

FOREIGN PATENT DOCUMENTS

WO      2000062172 A1    10/2000

OTHER PUBLICATIONS

Patent Cooperation Treaty the International Search Report and the Written Opinion of the International Searching Authority for PCT/US2015/060533, ISA/RU, Moscow, Russia, dated Feb. 25, 2016.

(Continued)

*Primary Examiner* — Paul Danneman
(74) *Attorney, Agent, or Firm* — M&B IP Analysts, LLC

(57) ABSTRACT

A method and system for managing inventory of a product in at least one store. The method comprises: determining, for each store, a seed inventory of the product based at least on distribution data for the product; and generating, for each store, an estimated current inventory of the product based on the respective seed inventory and at least one heuristic.

37 Claims, 4 Drawing Sheets

(56) References Cited

U.S. PATENT DOCUMENTS

| | | |
|---|---|---|
| 8,631,029 B1 | 1/2014 | Amacker |
| 8,682,739 B1 | 3/2014 | Feinstein |
| 9,319,745 B2 | 4/2016 | Rankine |
| 9,430,784 B1 | 8/2016 | Frederick et al. |
| 9,569,806 B2 | 2/2017 | Mirrashidi et al. |
| 9,933,864 B1 | 4/2018 | Worland |
| 9,978,078 B2 | 5/2018 | Georgoff et al. |
| 10,062,103 B2 | 8/2018 | Wantz et al. |
| 10,121,163 B2 | 11/2018 | Salari |
| 2001/0054008 A1 | 12/2001 | Miller et al. |
| 2002/0059117 A1 | 5/2002 | Yoch et al. |
| 2002/0143659 A1 | 10/2002 | Keezer et al. |
| 2002/0143669 A1* | 10/2002 | Scheer ............... G06Q 10/087 705/28 |
| 2003/0101413 A1 | 5/2003 | Klein et al. |
| 2004/0030741 A1 | 2/2004 | Wolton et al. |
| 2005/0097005 A1 | 5/2005 | Fargo |
| 2005/0165766 A1 | 7/2005 | Szabo |
| 2005/0187967 A1 | 8/2005 | Couch et al. |
| 2006/0004914 A1 | 1/2006 | Kelly et al. |
| 2006/0100924 A1 | 5/2006 | Tevanian |
| 2007/0100799 A1 | 5/2007 | Rose et al. |
| 2007/0100802 A1 | 5/2007 | Celik |
| 2007/0156677 A1 | 7/2007 | Szabo |
| 2007/0208719 A1 | 9/2007 | Tran |
| 2007/0244831 A1 | 10/2007 | Kuo |
| 2007/0250901 A1 | 10/2007 | McIntire et al. |
| 2007/0300142 A1 | 12/2007 | King et al. |
| 2008/0010120 A1 | 1/2008 | Chung et al. |
| 2008/0091526 A1 | 4/2008 | Shoemaker |
| 2008/0092054 A1 | 4/2008 | Bhumkar et al. |
| 2008/0163379 A1 | 7/2008 | Robinson et al. |
| 2008/0209308 A1 | 8/2008 | Brackney |
| 2008/0253739 A1 | 10/2008 | Livesey |
| 2009/0034784 A1 | 2/2009 | McQuaide |
| 2009/0148045 A1 | 6/2009 | Lee et al. |
| 2009/0248548 A1 | 10/2009 | Obermeyer |
| 2009/0271250 A1 | 10/2009 | Sriver et al. |
| 2009/0271289 A1 | 10/2009 | Klinger et al. |
| 2009/0281899 A1 | 11/2009 | Jiang |
| 2009/0300528 A1 | 12/2009 | Stambaugh |
| 2010/0153831 A1 | 6/2010 | Beaton |
| 2010/0185525 A1 | 7/2010 | Hazen et al. |
| 2010/0332496 A1 | 12/2010 | Horvitz et al. |
| 2011/0010245 A1 | 1/2011 | Priebatsch et al. |
| 2011/0016021 A1 | 1/2011 | Manning |
| 2011/0035275 A1 | 2/2011 | Frankel et al. |
| 2011/0099088 A1 | 4/2011 | Berrios et al. |
| 2011/0131235 A1 | 6/2011 | Petrou et al. |
| 2011/0131241 A1 | 6/2011 | Petrou et al. |
| 2011/0238474 A1 | 9/2011 | Carr et al. |
| 2011/0313856 A1 | 12/2011 | Cohen et al. |
| 2012/0016780 A1 | 1/2012 | Lee et al. |
| 2012/0095881 A1 | 4/2012 | Rothman |
| 2012/0167146 A1 | 6/2012 | Incorvia |
| 2012/0179556 A1 | 7/2012 | Ertas |
| 2012/0203661 A1 | 8/2012 | Baharloo et al. |
| 2012/0206647 A1 | 8/2012 | Allsbrook et al. |
| 2013/0138510 A1 | 5/2013 | Carnevali |
| 2013/0282520 A1 | 10/2013 | Tapley et al. |
| 2013/0283200 A1 | 10/2013 | Steelberg et al. |
| 2013/0290149 A1 | 10/2013 | Rashwan |
| 2013/0325644 A1 | 12/2013 | Sivaraman |
| 2013/0332262 A1 | 12/2013 | Hunt et al. |
| 2014/0019266 A1 | 1/2014 | Stoliartchouk et al. |
| 2014/0032518 A1 | 1/2014 | Cohen et al. |
| 2014/0040027 A1 | 2/2014 | Anderson et al. |
| 2014/0046789 A1 | 2/2014 | Baliga |
| 2014/0058850 A1 | 2/2014 | Reckert et al. |
| 2014/0129919 A1 | 5/2014 | Benson |
| 2014/0164913 A1 | 6/2014 | Jaros et al. |
| 2014/0180832 A1 | 6/2014 | Fox et al. |
| 2014/0184475 A1 | 7/2014 | Tantos et al. |
| 2014/0200998 A1 | 7/2014 | Olliphant et al. |
| 2014/0229270 A1 | 8/2014 | Rashwan |
| 2015/0062121 A1 | 3/2015 | Karakotsios et al. |
| 2015/0112790 A1 | 4/2015 | Wolinsky et al. |
| 2015/0120453 A1 | 4/2015 | Lee et al. |
| 2015/0154689 A1 | 6/2015 | Fitzpatrick |
| 2015/0178786 A1 | 6/2015 | Claessens |
| 2015/0227972 A1 | 8/2015 | Tang |
| 2015/0294377 A1 | 10/2015 | Chow |
| 2015/0302011 A1 | 10/2015 | Ochiai |
| 2015/0302424 A1 | 10/2015 | Akbarpour et al. |
| 2015/0326925 A1 | 11/2015 | Ozkan |
| 2015/0332385 A1 | 11/2015 | Hogg et al. |
| 2015/0350729 A1 | 12/2015 | Reynolds |
| 2015/0379615 A1 | 12/2015 | Dhar et al. |
| 2016/0049007 A1 | 2/2016 | Mullins et al. |
| 2016/0133055 A1 | 5/2016 | Fateh |
| 2016/0133170 A1 | 5/2016 | Fateh |
| 2016/0140532 A1 | 5/2016 | Kliper et al. |
| 2016/0148304 A1 | 5/2016 | Srinath et al. |
| 2016/0225045 A1 | 8/2016 | Cumberland et al. |
| 2016/0267569 A1 | 9/2016 | Hampson et al. |
| 2017/0116640 A1 | 4/2017 | Sah et al. |
| 2017/0200141 A1 | 7/2017 | Pattajoshi |

OTHER PUBLICATIONS

Patent Cooperation Treaty Written Opinion of the International Searching Authority for PCT/US2015/060609, ISA/RU, Moscow, Russia, dated Feb. 11, 2016.

The International Search Report and the Written Opinion for PCT/US2017/013175, dated Apr. 27, 2017, ISA/RU, Moscow, Russia.

* cited by examiner

INVENTORY MANAGEMENT SYSTEM AND METHOD THEREOF

CROSS-REFERENCE TO RELATED APPLICATIONS

This application claims the benefit of U.S. Provisional Application No. 62/147,771 filed on Apr. 15, 2015, and U.S. Provisional Application No. 62/079,804 filed on Nov. 14, 2014, the contents of which are hereby incorporated by reference.

TECHNICAL FIELD

The present disclosure relates generally to inventory management in commerce systems, and more particularly to e-commerce systems for brick-and-mortar stores carrying products.

BACKGROUND

The Internet has become the leading marketplace for purchasing goods and services. Consumers can now purchase almost any product, from groceries to vacations, through the internet. There are numerous websites that a consumer can make a purchase through. As an example, Home Depot® owns a website that allows consumers to purchase goods from its various brick and mortar stores. Retail chains, e.g., Target®, and other brick-and-mortar stores can offer goods available at their stores through their websites as well.

In order to purchase a certain product, a consumer has to search for dedicated electronic commerce (e-commerce) websites that offer the product for sale or search for the product within an e-commerce website. Some existing solutions may further facilitate online purchases and/or enhance in-store selling via e-commerce websites or search engines. However, such solutions typically do not provide accurate availability of goods in local stores. Because many consumers are more interested in finding the product anywhere than in one particular store or from one particular retail chain, e-commerce product listings that only show availability at particular stores are not always desirable.

Other disadvantages associated with e-commerce websites relate to the fact that a consumer cannot easily note if a certain product is "physically" available in a local store while searching for a website through which to purchase the product. In order to find such information, a consumer first searches for the product through an e-commerce website and then finds a nearby store (if such store exists) that keeps the desired product. Through this process, the inventory is only verified after the product is presented to the consumer. Besides being a cumbersome process for the consumer, e-commerce websites do not always maintain accurate information with regard to the current inventory of local stores. As a result, a product that is available may be presented as unavailable in a certain store, and vice versa. In most cases, the consumer has to directly connect to the local store (by, e.g., phone or email) in order to verify that the product is physically available. This connection requirement leads to fewer sales and consumer frustration.

Further, some customers are particularly interested in verifying a quantity of goods in stock in addition to merely whether the goods are in stock at a particular store. For example, a customer painting his or her entire house may wish to verify that he or she will be able to purchase multiple cans of the same paint from the same store. Verifying that a sufficient quantity of a product is in stock may require calling a salesperson at the store and requesting the salesperson to manually check inventory, which may be inconvenient to both the customer and to the salesperson.

In addition, a consumer searching for goods via e-commerce websites can gain knowledge about the local availability of the goods only through e-commerce websites that are related to the local stores. For example, a consumer shopping for a light bulb at the Home Depot® website can only find if the light bulb is available in a nearby Home Depot® store. However, the consumer does not know if the same light bulb is in a different (and possibly closer) store.

As local businesses, such as brick-and-mortar stores, often do not maintain e-commerce websites and/or do not invest in the promotion of such websites, consumers cannot easily locate and purchase goods offered by such businesses except by manually requesting information directly from the businesses. Further, even if such brick-and-mortar stores regularly stock particular goods, a consumer cannot find a particular local store that has the good in stock without searching every local store, either in person or by calling the store, for that good until the user finds a store that has the good in stock. This search can be time-consuming, physically demanding, expensive, and may involve the consumer dealing with adverse weather conditions in pursuit of the goods.

Moreover, from the perspective of the business, the inability of consumers to efficiently determine local availability of goods may prevent those consumers from having a definitive answer regarding whether a particular product is available for purchase and, as such, may lead to reduced sales. Such reduced sales may cause the local stores and/or distributors to stop carrying particular products even when there is sufficient demand for the products to justify carrying them.

Moreover, brick-and-mortar stores generally stock products without maintaining or otherwise dynamically updating the inventory as products are added or removed from the store. This leads to inaccurate inventory data that prevents local stores and distributors from determining, in real-time, which product is in short supply, out of stock, and so on, except by manually taking inventory (e.g., counting stock, subtracting numbers of goods sold from numbers of goods delivered, and so on). Such information is further valuable to distributors, who may wish to contact and supply inventory to the stores ahead of time (i.e., before the stores run out of stock).

In addition to the above, merchants and, in particular, brick-and-mortar stores, often do not invest in generating quality and accurate media assets related to the products offered for sale. A media asset may include, for example, a picture, a video clip, a textual description, and the like. As a result, a product is often identified merely by its stock keeping unit (SKU) which may be unique to a particular store, or by its universal product code (UPC). It would be further useful for consumers to be able to visually verify products that they are seeking from local stores.

It would therefore be advantageous to provide an inventory management system to be integrated in e-commerce solutions that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for managing inventory of a product in at least one store. The method comprises determining, for each store, a seed inventory of the product based at least on distribution data for the product; and generating, for each store, an estimated current inventory of the product based on the respective seed inventory and at least one heuristic.

The disclosed embodiments also include a system for managing inventory of a product in at least one store. The system comprises a processing unit; and a memory, the memory containing instructions that, when executed by the processing unit, configure the system to: determine, for each store, a seed inventory of the product based at least on distribution data for the product; and generate, for each store, an estimated current inventory of the product based on the respective seed inventory and at least one heuristic.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
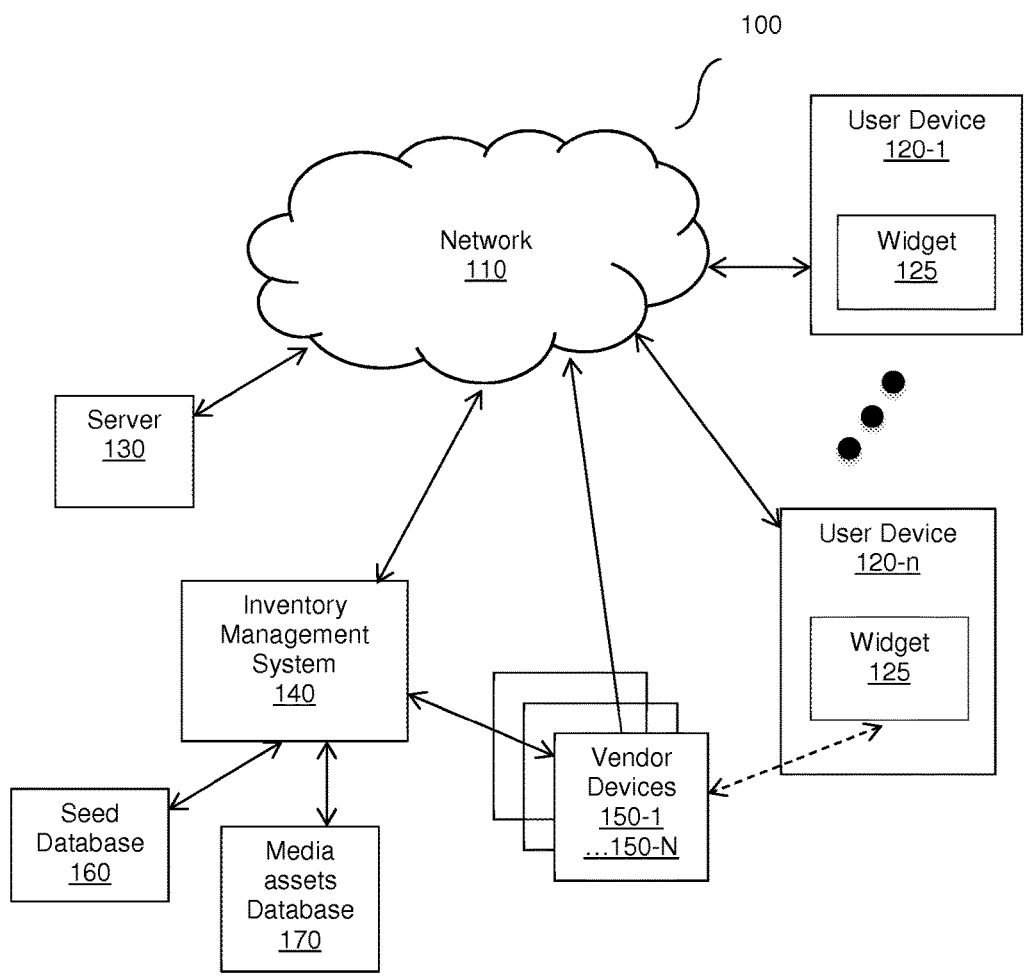
FIG. 1 is a diagram of a network system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting diagram of a network system 100 utilized to describe the various disclosed embodiments. The system 100 includes a network 110, a plurality of user devices 120-1 through 120-n, a server 130, an inventory management system 140, a plurality of vendor devices 150-1 thorough 150-n (hereinafter referred to individually as a vendor device 150 and collectively as vendor devices 150, merely for simplicity purposes), a seed database 160, and a media assets database 170.

The network 110 may be the Internet, the world-wide-web (WWW), a local area network (LAN), a wide area network (WAN), a metro area network (MAN), and other networks configured to communicate between the elements of the 110. A user device 120 may be a personal computer (PC), a personal digital assistant (PDA), a mobile phone, a smart phone, a tablet computer, a wearable computer device, an e-reader, a game console, and the like.

The vendor devices 150 are operated by vendors and may be any type of an e-commerce system, a connected point of sale (POS), or an inventory management system operated by the vendor. A vendor may be a brick-and-mortar vendor, an online vendor, and the like. Examples for brick-and-mortar vendors include, but are not limited to, local stores, restaurants, bars, hotels, service providers, and other sellers of goods. In certain embodiments, the vendor devices 150 are operated by manufacturers, distributors, importers, and/or wholesalers of the products. For example, a vendor device may be operated by a winery or by a liquor distributor.

The server 130 and the inventory management system 140 are also communicatively connected to the network 110. The server 130 may be configured to analyze any media content displayed over a user device 120 to determine if there are any goods that are related to, or mentioned in, the content viewed by a user of the user device 120. Such content may be, but is not limited to, a webpage, an e-book, an electronic game, and the like. The media content may be pre-processed and sent to the server 130 by a script, a widget, or any other virtual point of sale 125 executed over the user device 120. Additionally, the location of the displayed content such as, e.g., a URL of a webpage, may be sent to the server 130. Moreover, the content may be analyzed by the widget 125 to determine if such content includes at least one product that is related to, or mentioned in, the content viewed by a user of the device 120. The widget 125 may be, but is not limited to, embedded in a webpage, an agent installed in the user device, a web browser add-on, an application, integrated in a Document Object Model (DOM), and the like.

The server 130 and/or the widget 125 may perform textual analysis, image analysis, and or/video analysis to determine if there is at least one product that is related to, or mentioned in, the content viewed by a user of the user device 120. The determination may be performed against a configurable set of product names and a configurable list of vendors that offer these products for sale. For example, if the server 130 and/or the widget 125 is configured with the product names "New Balance 930" and "Nike Air Jordan", appearances or mentions of these products will be identified via the textual, image, and/or video analysis.

The server 130 may also be configured with a list of vendors that offer products designated in sets of product names. It should be noted that any entity such as a vendor, merchant, seller, and/or service provider can register to offer its products for sale. The registration may be with, but not limited to, the server 130, the inventory management system 140, and so on. To this end, each such entity is merely required to provide information such as, but not limited to, a list of products and their prices, a location of a store of the entity, operation hours, accepted payment methods, current inventory levels, and so on. It should be further noted that some of the details required for the registration can be retrieved directly from the vendor devices 150 by the server 130. In an embodiment, the inventory management system 140 may be configured to estimate inventory levels as described further herein below for stores of registered entities.

In response to determination of at least one product by the server 130 or the widget 125, a location, a purchase history, and/or a user profile of a user of the user device 120 is typically determined. This information can be retrieved through a GPS, through a web browser installed in the user device 120, based on a network connection, and/or provided by the user.

According to various exemplary embodiments, based on this information, the server 130 may be configured to identify one or more of the vendors. For example, the server 130 may be configured to identify vendors that are in the vicinity of the user device 120 and/or that the user has previously purchased from. The vicinity may include, but is not limited to, in the same neighborhood, borough, town, city, state, or country as the user device; within a predetermined distance of the user device; within a predetermined travel time from the user device based on mode of locomotion (e.g., less than 5 minutes by car); and so on.

Thereafter, the server 130 is configured to query the inventory management system 140 about the inventory level of each identified product offered for sale by vendors in the proximity of the user (consumer). An exemplary and non-limiting inventory management system 140 is described further herein below with respect to FIG. 2.

In an embodiment, the inventory management system 140 is configured to provide information regarding inventories of products offered by stores. The information may be displayed via, e.g., a virtual POS displayed on a user device. Such information may include, but is not limited to, current inventories of products in stock, the stores having the products in stock, media assets of the products in stock, and so on. To this end, in an embodiment, the inventory management system 140 is configured to monitor and estimate the inventory levels of products (goods) being sold by vendors. The inventory management system 140 may or may not be connected to the vendor devices 150. As a result, the inventory levels periodically estimated by the inventory management system 140 are not dependent on updates to inventory data entered or provided by vendors via the vendor devices 150. For example, such estimation may be performed weekly, daily, monthly, and so on.

In an embodiment, the inventory management system 140 is configured to estimate the current inventory level of a product at a certain vendor at a given point in time. Alternatively or additionally, the inventory management system 140 is configured to determine the probability that a particular vendor has a particular quantity of the product in stock at a given point in time. As will be discussed in more detail below, the inventory level is estimated based on seed inventory data. The seed inventory data represents a baseline inventory level at a given time. The seed inventory level may be determined based on seed inventory heuristics such as, but not limited to, distributions of inventory received from a distributor of the product; full or partial information regarding the product received from the vendor, an importer of the product, and/or a wholesaler; user reports; and/or other data extracted from other sources available over the web or contributed by users. It should be noted that the seed inventory level does not need to be directly provided by a vendor (i.e., the vendor does not need to explicitly send a seed inventory level value). Rather, the seed inventory may be determined implicitly and/or based on information maintained by entities other than the vendor (e.g., a distributor may note quantities of products sold to particular vendors). Accordingly, the inventory management system 140 may estimate a current inventory without requiring that a vendor maintain and update the seed inventory.

In an embodiment, the seed information can be determined implicitly based on the inventory distributed to all stores in a limited geographic area. As a non-limiting example, if a wholesaler reports selling 1,000 bottles of a particular wine in a city and there are 100 comparable stores that sell the wine in that city, it may be estimated that each store has an initial inventory of 10 bottles of the wine. In a further embodiment, the seed information may be further determined based on, e.g., relative sizes of the comparable stores, known relations between stores, known inventory levels of other products in a given store, and historical inventory levels (such as, e.g., previously determined seed inventory levels and/or estimated inventory levels). Size may be based on, but is not limited to, a number of employees working for the store, an area or volume of the physical store, an annual gross income, previous quantity of sales of the product and/or associated products, and so on. As a non-limiting example, only two stores in a city sell a particular brand of cheese. The larger store occupies twice the square area of the smaller store. If a wholesaler reports selling 300 packages of the cheese in the city, the initial inventory of the larger store may be determined to be 200 packages i.e., twice the initial inventory of the smaller store.

In an embodiment, the seed inventory information is saved in the seed database 160. The inventory management system 140 may be communicatively connected to the seed database 160. In another embodiment, the seed database 160 is embedded in the inventory management system 140. The inventory management system 140 may be further configured to update the initial seed inventory level based on a plurality of the seed inventory heuristics, and preferably based on purchases made through the server 130. Updates to the estimated inventory may further be based on information received from the vendors. It should be noted that not all purchases are performed through the server 130. As a result, information received from the server 130 respective of purchases may include an incomplete record of purchases.

According to some exemplary embodiments, the heuristics used in estimating current inventory levels of products may include, but are not limited to, a type of product, a time of day, weekly or annual trends, seasonal trends, industry patterns, patterns of sales in comparable stores, trends for associated products, promotions, external events, location of a vendor's store, combinations thereof, and so on. Two stores may be comparable if, e.g., the two stores carry the same type of products, the two stores are proximate to each other (i.e., within a predetermined geographical distance of each other), combinations thereof, and so on. The type of product may influence inventory determinations because sales of particular products tend to fluctuate based on, e.g., the passage of time, industry trends, and so on.

As a non-limiting example of a time of day heuristic, the stock of a product may tend to go down later in the day (e.g., the stock of a product at 5 P.M. will likely be lower than the stock at 9 A.M., assuming no shipments are made during the day). Weekly trends may include particular days of the week in which certain products are sold in higher volume. As a non-limiting example, sales of movie tickets may tend to increase (thereby reducing stocks of such tickets) over the weekend (e.g., Friday, Saturday, and Sunday).

Annual trends may include holidays (e.g., Fourth of July, Halloween, Thanksgiving, etc.). Sales of goods may be higher during certain times surrounding or leading up to holidays. As a non-limiting example, stores selling costumes may have reduced costume inventories in the month preceding October $31^{st}$ due to the approach of Halloween.

Seasonal trends may be related to holiday trends and/or influenced by broader repercussions of shifts in weather. As non-limiting examples, sales of red wine may increase during winter, sales of beers and white wines may increase during the summer, and so on. Industry trends may include shifts in sales that occur due to, for example, increased general popularity of certain products. As a non-limiting example, a product shown on a news show may begin seeing increased sales thereafter. As another example, sales of all products featuring a particular vegetable may increase when the vegetable is reported as being a "superfood." In an exemplary embodiment, seasonal and/or industry trends may be fed to the inventory management system 140 by external servers or services and/or may be input by a user.

In another embodiment, the inventory management system 140 may be configured to detect and analyze trends and patterns via a machine learning process, thereby adapting estimations accordingly. In a further embodiment, such detection may be based on purchase transactions received from, e.g., the server 130. As a non-limiting example, increases in numbers of purchase transactions of pumpkin spice received during September and October may be detected as a seasonal trend. Accordingly, expected sales of pumpkin spice may be higher during the months of September and October.

In an embodiment, the inventory management system 140 may be configured to determine increased orders and/or decreased inventory of nearby stores that sell a product when estimated inventories for comparable stores are low. As a non-limiting example, if a nearby vendor who documents its inventory of a particular product (e.g., a nearby Wal-Mart® that makes its inventory available online) indicates that it is nearly sold out of a particular product, the inventory of that product held by nearby brick-and-mortar stores may be estimated to be lower than normal.

The heuristics may further include sales of associated products. Associated products include products that are typically sold together. An associated product may be, but is not limited to, an accessory or an otherwise complimentary product. As non-limiting examples, an associated product for wine may be cheese, an associated product for boots may be a purse, an associated product for a meal order may be a beverage, an associated product for a computer game may be downloadable content for that game, and so on.

Associated product pairings may further be determined based on, e.g., seasonal trends, annual trends, and so on. As a non-limiting example, candy and costumes may be considered associated products during October due to Halloween, while candy and costumes are not considered associated products during the remainder of the year.

The heuristics may further include current promotions associated with each identified product. As an example, a happy hour, a valid coupon, and the like can be determined to be current promotions. Such promotions may be input to the inventory management system 140 by the server 130, by the vendors, and/or distributors of the product. The estimated inventory level of a product that is the subject of an ongoing promotion may be determined to be lower than that of the product without promotions.

The heuristics may further include the location of a vendor's store. Stores in higher traffic and/or more densely populated areas (e.g., a city as opposed to a rural area) will often tend to see higher average sales than stores in less active shopping areas. In an embodiment, the effect of location on sales may further be based on one or more trends in sales in the particular location. As an example, sales of football paraphernalia for the New York Giants® football team in New Jersey may be increased when trends in sales indicate that sales of such paraphernalia in states near New York increases.

The heuristics may further include external events. External events are occurrences in the area that would likely cause a temporary increase in sales of particular products. As a non-limiting example, the existence of a wine festival nearby may result in increased wine sales, a book signing by a famous author may lead to increased sales of that author's works, the premiere of a movie may lead to increased sales of merchandise associated with the movie, and so on.

The server 130 may be configured to send a list of products and/or vendors to the inventory management system 140. In response, the inventory management system 140 is configured to return the probability that each vendor keeps a sufficient inventory level of a product. A sufficient inventory level is a configurable parameter such as, e.g., an integer number equal to or greater than 1. As an example, for one order of a product $P_1$ and vendors $V_1$, $V_2$ and $V_3$, the system 140 estimates and returns the values 0.4, 0.9 and 0. That is, the probabilities that vendors $V_1$, $V_2$, and $V_3$ currently hold product P1 in their inventory are 0.4, 0.9, and 0, respectively. Based on the returned probabilities, the server 130 is configured to determine whether there is a sufficient inventory of product.

At least upon determination that there is a sufficient inventory level for at least one identified product, the server 130 is configured to cause the widget 125 to modify the content (e.g., a webpage) displayed over the user device 120 to inform the user the content is available for sale. As a non-limiting example, a call-to-action (CTA) button in a form of an icon or any other interactive feature can be added to a webpage indicating that a product(s) mentioned in the webpage is available for sale by vendors. It should be noted that the CTA button may be in any size, shape, and/or color. In an embodiment, the appearance of the CTA button may be determined based on the probability that a respective product is available.

Upon detection of a user's gesture with respect to the CTA button, a virtual point of sale is generated as an overlay over the displayed content (e.g., on a user device). The virtual point of sale allows the consumer to purchase the product directly from the vendor without navigating to a different web site. That is, the generated virtual point of sale operates completely within the webpage or other content (e.g., e-book) currently displayed over the user device 120.

In an embodiment, the server 130 is configured to generate the virtual point of sale by means of the widget 125. To this end, the server 130 is configured to select vendors determined to have inventory of the identified product. The selection is based on estimated current inventory levels generated by the inventory management system 140, the probabilities computed by the inventory management system 140, promotion information, a location of a vendor with respect to the user, or any combination thereof. The server 130 is further configured to query a vendor through a respective vendor device 150 about the price of the product and applying a current promotion(s). Thus, a list of vendors and the product prices are displayed to the user as part of the virtual point of sale. In an embodiment, a media asset associated with the product is also displayed to the user. The media assets may be obtained from the media assets database 170.

The server 130 may be configured to enable a purchase transaction of the user for the product on behalf of the vendor, to notify the vendor about the purchase, and/or to inform the user when the product will be ready for pick-up or delivery from the vendor. In an embodiment, directions to the vendor may be displayed to the user. The purchase transaction may also allow the user to RSVP, chat, or speak with a vendor's sales representative, share the product with others (e.g., social connections), and so on. Thus, the user of a user device 120 can perform and complete the entire purchase transaction from the virtual point of sale without navigating away from the current webpage. In an embodiment, to allow the completion of the purchase transaction, a direct communication channel can be established between a vendor device 150 of the respective vendor and a user device 120. Such a communication channel may be realized through Network Protocols, Interactive Protocols, emails, SMS messages, instant messaging, or any other generic or dedicated communication protocol.

In an embodiment, the inventory management system 140 is configured to receive information from the server 130 upon completion of a purchase transaction. Such information includes the product and the respective vendor through which a purchase has been made. The inventory management system 140 is configured to update the inventory level of the respective product and vendor based on any such purchase transaction information.

The media assets database 170 contains media assets that can be associated with the products maintained by the inventory management system 140. A media asset may include, but is not limited to, a picture, a video clip, a textual description, or any other media identifying or otherwise describing a product. For example, a media asset of a wine bottle may be a picture of the wine's label. As another example, media assets of a vacuum cleaner may include a picture of the vacuum cleaner, a video clip demonstrating the vacuum in use, a textual description of the vacuum's features, and a textual description of the vacuum cleaner's technical specifications.

Each media asset stored in the media assets database 170 may be associated with a unique identifier such as an SKU. In an embodiment, the virtual point of sale generated by the server 130 may include the media assets associated with the SKU of each product identified in a webpage. To this end, the inventory management system 140 may further be configured to provide media assets associated with each identified product to the server 130 for display via, e.g., the virtual point of sale.

In an embodiment, the inventory management system 140 is communicatively connected to the media assets database 170. In another embodiment, the media assets database 170 is embedded in the system 140. Communications between the inventory management system 140 and the media assets database 170 allows various vendors to share access to public assets associated with products while only allowing each vendor to access its own private assets (e.g., prices, inventory levels, and so on). Such public assets may include, but are not limited to, images and videos of products, product descriptions, products reviews, and so on. As a result, information displayed to a user may include public assets identifying the product as well as private assets relating to purchasing the product.

According to various embodiments, the vendor devices 150 interface with the inventory management system 140. This interface allows each vendor to manage (i.e., view, provide information about, etc.) its inventory via the inventory management system 140. It should be noted that inventory data of each vendor is typically stored separately from that of other vendors, such that, for example, a vendor accessing the inventory management system 140 through the vendor device 150-1 may not be able to view any information of a vendor accessing the system 140 through the vendor device 150-N.

In certain embodiments, the inventory management system 140 is configured to analyze information received from a vendor respective of inventory data maintained by the inventory management system 140. This analysis is utilized, in part, to verify information provided through the vendor devices 150 (e.g., as part of the seed data), to generate inventory analytics, and so on. Thus, the inventory management system 140 may be configured to determine whether inventory provided by a vendor via the vendor device 150 is accurate. This determination is achieved by cross-correlating information entered by the vendor with information stored in the inventory management system 140 (or information provided by external channels).

Such cross-correlation may include comparing values provided by a vendor to known values of, e.g., that vendor, other comparable vendors, combinations thereof, and so on. For example, if a vendor enters a product $P_1$ with a quantity $Q_1$ and a tag price $TP_1$, these details can be checked against information related to the same product that was provided by other vendors. If the tag price $TP_1$ is lower or higher than a price tag $TP_X$ by a predefined threshold, the inventory management system 140 is configured to generate a warning message. In another embodiment, the inventory management system 140 is configured to generate an error message if the quantity $Q_1$ is lower or higher than the quantity reported to be typically shipped to the vendor.

In an embodiment, inventory information may be analyzed to generate one or more inventory analytics. The generation of inventory analytics may be for a specific product or group of products, a specific vendor or group of vendors, or any combination thereof, and may indicate trends, patterns, and so on. For example, a rapid decline in the inventory level of a certain product may indicate that the product is trendy (i.e., there has been an increasing trend in sales of the product). In such a case, a message may be generated and sent to vendors to suggest that those vendors increase their inventories of the trendy product. Further, the inventory analytics may be utilized to identify trends in inventories. Such trends may be further used when estimating inventory levels. In particular, inventory analytics for a particular product may be utilized to determine whether to raise or lower the estimate of the product for any particular store and/or for all stores.

As another non-limiting example, a rapid decline in the inventory level of a certain product with a tag price of TPy and static inventory level of the same product priced at tag price TPz may indicate that the right price for the product is between TPy and TPz. In a further embodiment, the inventory analytics may be generated in response to a request from, e.g., a consumer, a vendor, a distributor, and so on.

It should be noted that the above description discusses the inventory management system estimating inventories and probabilities respective of a request from the server 130 attempting to generate a virtual point of sale including product information merely for simplicity purposes and without limitation on the disclosed embodiments. In various embodiments, the inventory management system 140 may provide information directly to a consumer, vendor, distributor, and so on. Such information may be provided pushed by the system 140 or pulled by the other devices.

The information may include, but is not limited to, estimated inventory levels of products, probabilities that the store has certain quantities of products in stock, trends or patterns in sales, and so on. In a further embodiment, each vendor may configure the inventory management system 140 with one or more permissions regarding provision of information. As a non-limiting example, a vendor may choose to allow the inventory management system 140 to send certain distributors estimated inventory levels for its products. As another non-limiting example, a vendor may choose to allow the inventory management system 140 to send distributors estimated inventory levels but not trends or patterns in sales.

It should be noted that a widget 125 is described herein merely for simplicity purposes and without limitation on the disclosed embodiments. Other types of virtual points of sale allowing display and/or receipt of information may be utilized without departing from the scope of the disclosure. Additionally, a call to action (CTA) button is described merely for simplicity purposes and without limitation on the disclosed embodiments. Other interactive features using a variety of appearances and/or interactions (e.g., sound, user gestures other than clicking, and so on) may be used in addition to a clickable CTA button without departing from the scope of the disclosure.

In an embodiment, the inventory management system 140 is integrated in the server 130. Each of the server 130 and the inventory management system 140 includes at least a memory and processing system (not shown in FIG. 1). The processing system may comprise or be a component of a larger processing system implemented with one or more processors. The one or more processors may be implemented with any combination of general-purpose microprocessors, microcontrollers, graphics processing units (CPUs), digital signal processors (DSPs), field programmable gate array (FPGAs), programmable logic devices (PLDs), controllers, state machines, gated logic, discrete hardware components, dedicated hardware finite state machines, quantum computers or any other suitable entities that can perform calculations or other manipulations of information.

Figure 2:
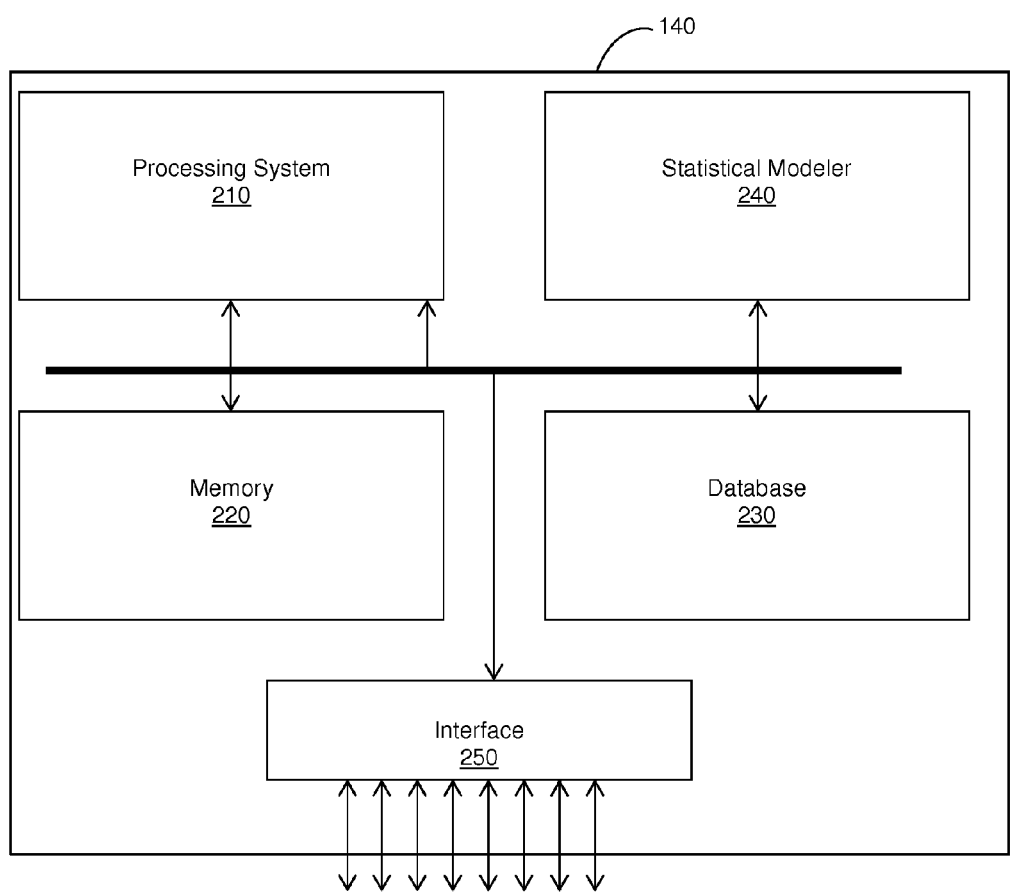
FIG. 2 is a schematic block diagram of an inventory system according to an embodiment.

FIG. 2 is an exemplary and non-limiting schematic block diagram of an inventory management system 140 according to an embodiment. The inventory management system 140 includes a processing system 210, a memory 220, a database 230, a statistical modeler 240, and an interface 250. The memory 220 typically contains instructions that, when executed by the processing system 210, configures the inventory management system 140 to perform the methods described further herein. In particular, the instructions contained in the memory may configure the system 140 to perform the method of estimating a current inventory described further herein below with respect to FIG. 3. The processing system 210 may be realized using any of the implementations described in detail herein above.

The database 230 may be used to store information related to calculating the current inventory of a product in a particular store. Such information may include, but is not limited to, information related to the seed inventory information retrieved from a seed database (as described further herein above with respect to FIG. 1), an initial inventory, a previously determined inventory, a set of heuristics, a set of seed heuristics, and so on.

The statistical modeler 240 is configured to use information stored in the database 230 to calculate an estimated current inventory of a product in a vendor's store. In an embodiment, the estimated current inventory may be calculated by applying a Markov model respective of information related to the set of heuristics. As a non-limiting example, a potential customer views a particular toy on a website in December. In this example, the statistical module 240 may apply a Markov model when information in the inventory management database 230 indicates that an initial inventory of the toy in a nearby toy store was likely 20 toys based on a shipment to the toy store 3 days prior. Heuristics considered pursuant to the Markov model illustrate that, although during a "normal" time of year, it would be expected that 2 of the toys in inventory would be sold per day, the holiday shopping season in December leads to increased average sales of 5 toys per day. As a result, it is determined that there is an estimated current inventory of 5 toys left in the store (i.e., an initial inventory of 20 toys minus the product of 5 toys per day by 3 days). The statistical modeler 240 can be implemented as a processing system includes one or more processors as discussed above.

The interface 250 allows various entities to upload/import and/or retrieve/export data to and from the inventory management system 140. The various entities include systems or servers, a point of sale (PoS) system or other computing devices of the distributors, importers, regulators, wholesales, vendors, e-commerce systems, and users of such entities. The importing and exporting data may include, but is not limited to, defining external events (e.g., indicating that a wine festival is occurring on a particular week), providing a trend, subscribing to trends detected by the inventory management system 140 (i.e., requesting information regarding trends as they are detected), sending estimated current inventories, sending probabilities, receiving and sending media assets, and so on.

It should be noted that the connections among components of the inventory management system 140 as illustrated in FIG. 2 are merely exemplary and do not limit any of the disclosed embodiments. Any or all of the components of the inventory management system 140 may be communicatively or otherwise connected to any other components of the inventory management system 140 without departing from the scope of the disclosure.

Figure 3:
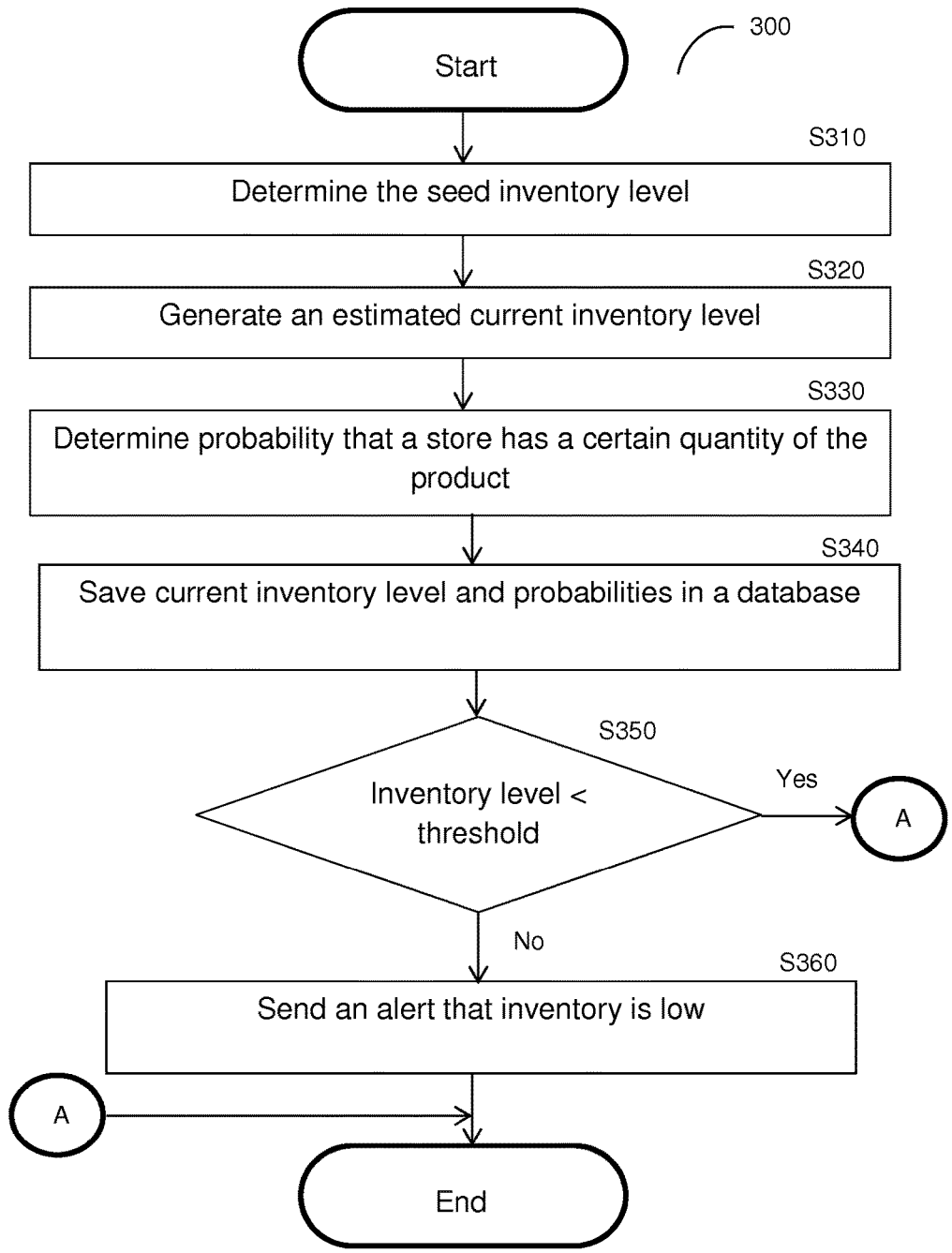
FIG. 3 is a flowchart of a method for estimating a current inventory level of a product according to an embodiment.

FIG. 3 is an exemplary and non-limiting flowchart illustrating a method for estimating a current inventory level of a particular product at a particular store according to an embodiment. In an embodiment, the method may be performed by an inventory management system (e.g., the inventory management system 140).

In S310, the seed inventory level of a product in a store is determined. The seed inventory level may be determined explicitly (e.g., by retrieving the initial inventory value directly from a database) or implicitly (e.g., by retrieving information related to the initial inventory from a database and estimating the initial inventory respective thereof). Information related to the initial inventory may be stored in a local database (e.g., the database 230) or may be stored in a remote database (e.g., the seed database 160). Determination of seed (initial) inventory levels is described further herein above with respect to FIG. 1. The seed inventory level is a baseline value of the inventory level for the product in a store. For example, the seed inventory level may be the inventory value for a store immediately after receiving a shipment of goods.

In S320, respective of the determined seed inventory level, an estimated current inventory level of the product is generated. In an embodiment, the estimated current inventory level is generated based on time elapsed since the seed inventory information is fed to the system. In another embodiment, the estimated current inventory level of the product in the store may be generated based on, but not limited to, an estimated average quantity of the product sold per time period (e.g., hour, day, week, and so on).

In one embodiment, the average quantity of the product sold per time period is determined respective of one or more heuristics. Such heuristics may include, but are not limited to, a type of product, a time of day, weekly or annual trends, seasonal trends, industry patterns, patterns of sales in comparable stores, trends for complimentary products, promotions, external events, relative size of a vendor's store, combinations thereof, and so on. Heuristics are described further herein above with respect to FIG. 1.

In S330, based on the estimated current inventory of the product in the store, a probability that the store has a certain quantity of the product in stock is determined. In an embodiment, the probability that the store has a particular quantity of the product in stock may be calculated via a Markov model that accounts for the current estimated inventory level.

In various embodiments, S330 involves calculating a plurality of probabilities that the store has various quantities of a product in stock. As a non-limiting example, S330 may yield probabilities $\{p_1, p_2, \ldots, p_n\}$, where $p_1$ is the probability that the store has one of the product in stock, $p_2$ is the probability that the store has two of the product in stock, and so on. In S340, the estimated inventory level of the product in the store as well as the computed probabilities are saved in a database (e.g., the database 230).

Optionally, in S350, it is determined whether the estimated inventory level is below a predefined threshold and, if so, execution continues with S360; otherwise, execution terminates. In S360, an alert indicating a low inventory level is generated and sent (through, e.g., the interface 250). The alert may be sent to a vendor, a distributor, and so on.

As a non-limiting example, based on distributions of 100 tennis rackets in a city having 5 stores that sell tennis rackets, a seed inventory level for a tennis racket of a store in the city is determined to be 20 rackets. The seed inventory level is determined to be based on distributions made two days ago. It is determined that an average sale of tennis rackets per day in such a store is 8. Accordingly, an estimated current inventory of 4 rackets (20 baseline−8 rackets/day times 2 days) is generated. A Markov model is used to determine that a probability of the store having the racket in stock is 80%. Further, based on a suggested threshold of 10 rackets, it is determined that inventory is low, and an alert respective thereof is generated.

It should be noted that the method can be executed at predefined time intervals (e.g., every 120 hours), when the seed inventory information has been changed, and/or upon a specific external request. For example, the method may be executed upon receiving a request for product information for a virtual point of sale, upon receiving information regarding an external event, and so on.

According to various embodiments, the inventory data maintained by the inventory management system 140 can be analyzed. The analysis is utilized, in part, to verify information provided through the vendor devices 150 (e.g., as part of the seed data), to generate inventory analytics, and the like. Exemplary and non-limiting embodiments for verification of the inventory data are provided above with respect to FIG. 1.

It should be noted that the method of FIG. 3 is described herein with reference to a particular store and product merely for the sake of simplicity and without limitation on the disclosed embodiments. The method may be applicable to multiple products and/or stores without departing from the scope of the disclosure.

Figure 4:
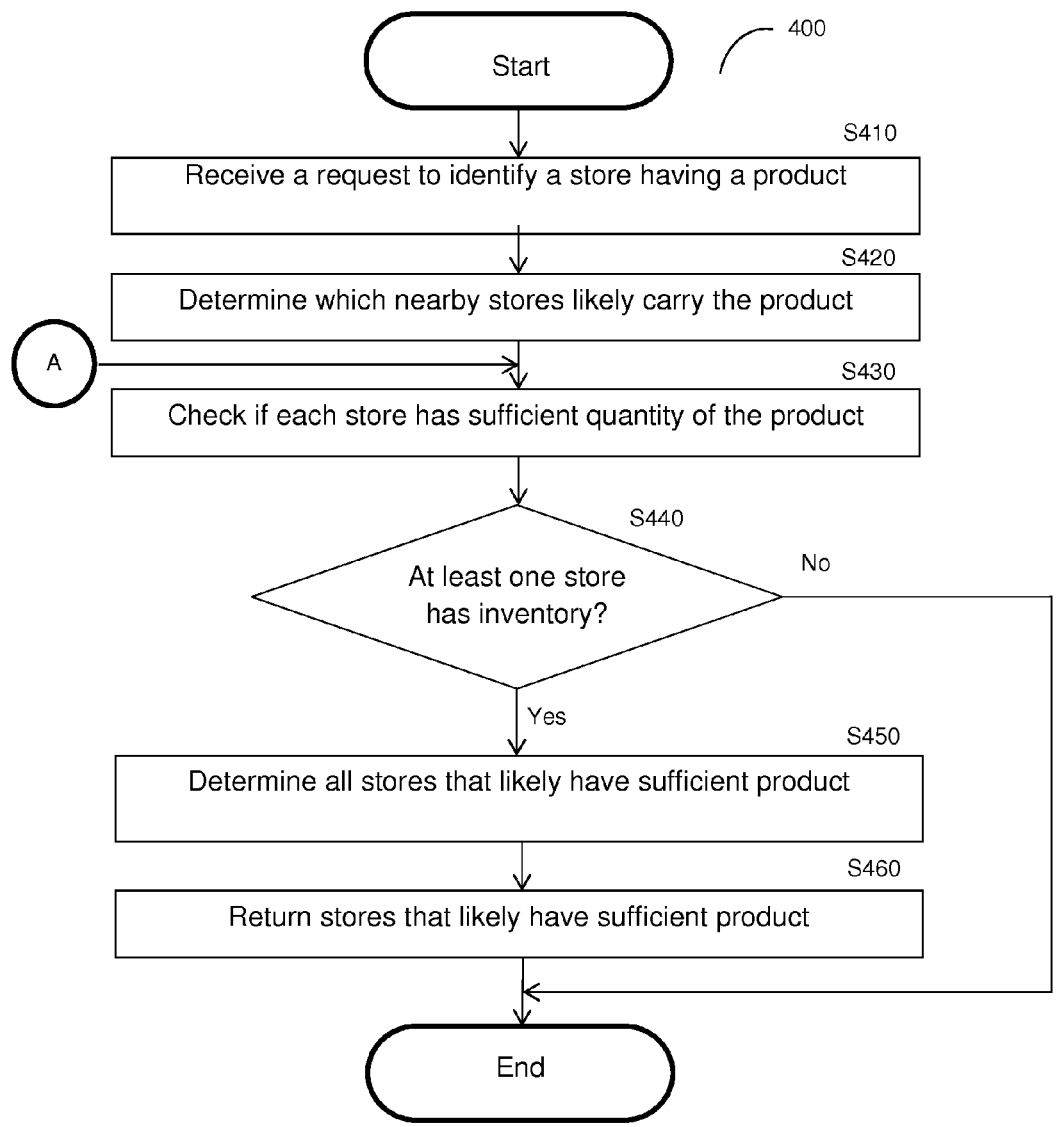
FIG. 4 is a flowchart of a method for identifying a store that is likely to have a sufficient quantity of a particular product according to an embodiment.

FIG. 4 is an exemplary and non-limiting flowchart 400 illustrating a method for identifying a store that is likely to have sufficient quantity of a particular product in stock according to an embodiment. In an embodiment, the identification may be performed by an inventory management system (e.g., the inventory management system 140).

In S410, a request to identify a store that is likely to have particular quantity of a product in stock is received. The request may include, but is not limited to, a geographic location of a potential customer, a product description, and a requested quantity.

In S420, based on the geographic location of the potential customer and the product description, it is determined which nearby stores would likely carry the product (even if the product would not necessarily be in stock). A store may be nearby if, for example, the store is within the vicinity of a user device of the potential customer. The vicinity may include, but is not limited to, in the same neighborhood, borough, town, city, state, or country as the user device; within a predetermined distance of the user device; within a predetermined travel time from the user device based on mode of locomotion (e.g., less than 5 minutes by car); and so on. As a non-limiting example, a store may be nearby if it is less than 1 mile away from the potential customer. A store may be likely to carry the product if, for example, the product category aligns with a category of the store, if the store lists the product on its website, and so on. As a non-limiting example of a product category that aligns with a category of a store, a hammer may fall into the product category "home improvement tools" that is typically carried by stores that are categorized as hardware stores. Determination of which stores likely carry the product may reduce utilization of computing resources by pre-filtering stores before generating estimated inventories for each store.

In S430, a probability that each determined store has at least the requested quantity of the product in stock is determined. In an embodiment, the probability that each determined store has at least the requested quantity of product in stock may be the sum of probabilities of the store having quantities of the product that are greater than or equal to the requested probability. For example, if a user requests 3 of a product, the probability that a store has at least 3 of the product in stock may be the sum of the respective probabilities that the store has 3, 4, 5, and so on of the product in stock. Determination of probabilities that stores have particular quantities of products in stock is described further herein above with respect to FIG. 3.

In S440, all stores that likely have a sufficient amount of the product in stock are determined. In an embodiment, a store likely has a sufficient amount of the product in stock if, e.g., the probability that the store has the requested quantity of the product in stock exceeds a threshold (e.g., 50%). Such a threshold may vary based on one or more sufficiency heuristics. As a non-limiting example, the threshold may be raised during a season in which more of the product will sell because the inventory of the product at any particular time during a high sales volume season tends to be lower than that of the product at the same time during a normal sales volume season. In another example, the threshold may be set respective of the method of delivery. For example, a higher threshold is set for in-store pick-up than for product shipping because product shipping may allow time for additional deliveries to come in and/or may require an employee to set aside the ordered good.

In an embodiment, the threshold may further provide an allowance for error. The allowance reduces the chance that an incorrect estimation of inventory will result in improper determination of a store as likely to have the requested quantity of product in stock. Accordingly, the threshold may be further raised depending on the likelihood of sudden significant changes in inventory. As a non-limiting example, the allowance for determination of whether a store has a particular grill in stock may be higher during the month of June than during the month of October because seasonal trends indicate high volumes of grill sales during the summer months.

In S450, each store that likely has a sufficient quantity of the product in stock is returned. In an exemplary embodiment, one store is selected and returned. The selection may be based on, but not limited to, the probability and/or location of each store that likely has a sufficient quantity of the product in stock. For example, if three nearby stores each have a 90% probability of having the product in stock, the store that is closed to the consumer may be selected and returned. In another embodiment, multiple stores may be returned. In a further embodiment, the returned stores may be displayed in a ranking order based on their relative probabilities and/or locations. For example, if three nearby stores have probabilities of 70%, 60%, and 50%, respectively, the three stores may be returned in order from highest to lowest probability.

In an embodiment, the selection may be further based on one or more user preferences of the consumer requesting a particular quantity of the goods. The user preferences may define an importance of one or more factors such as, but not limited to, probabilities and/or locations of stores having the product in stock. In a further embodiment, the user preferences may rank, weigh, or otherwise prioritize factors based on importance to the user. As an example, the user preferences may rank probability higher than location such that nearby stores having the highest probability of having the requested quantity of product in stock are prioritized over closer stores having lower probabilities.

As a non-limiting example, a request to identify a nearby store that has at least one pair of a particular shoe in stock, a geographic location of a potential customer, and a product identification number for the shoes are received. The threshold for a store being nearby is within 6 miles of the potential customer. In this example, stores A, B, and C are located 3 miles, 1 mile, and 5 miles away from the potential customer, respectively. Additionally, all three stores are determined to have previously purchased the pair of shoes from a shoe distributor. Thus, stores A, B, and C are determined to be nearby stores that are likely to carry at least one pair of the shoes.

An initial inventory for store A is determined to be 10 pairs of the shoe. Based on the date and any relevant trends, a current inventory for store A is determined to be 2 pairs of the shoe in stock. Additionally, the probability that store A has one of the pair of shoes in stock is determined to be 0.5. Respective analyses for stores B and C yield initial inventories of 15 pairs of shoes for store B and 13 shoes for store C, current inventories of 3 pairs of shoes for store B and 5 pairs of shoes for store C, and probabilities of 0.8 for store B and 0.8 for store C. A threshold for being likely to have the shoe in stock is determined to be 0.6. In this example, since store B has the highest probability of having at least one pair of the shoe in stock while being the closest store to the potential customer and since the probability for store B is above the threshold probability, store B is selected to be identified.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for managing inventory of a product in at least one store, wherein the method is performed by an inventory management system with respect to a listing of the product on an electronic commerce (e-commerce) website, comprising:
    determining, for each store, a seed inventory of the product based at least on distribution data for the product; and
    generating, for each store, an estimated current inventory of the product based on the respective seed inventory and at least one seed inventory heuristic determined based on information maintained by entities other than a vendor of the product; and
    causing the display of information regarding the estimated current inventory to a virtual point of sale (POS) on a user device.

2. The method of claim 1, further comprising:
    computing, for each store, at least one probability that the store has at least one quantity of the product in stock based on the estimated current inventory, wherein each probability corresponds to a quantity of the at least one quantity.

3. The method of claim 2, further comprising:
    selecting at least one of the computed probabilities; and
    sending the selected at least one computed probability.

4. The method of claim 3, wherein the at least one estimated current inventory is selected based on preferences of a consumer.

5. The method of claim 4, wherein the consumer preferences include any of: favoring closer stores, and favoring stores that have higher probabilities of having a requested quantity of the product in stock.

6. The method of claim 3, further comprising:
    identifying at least one identifier of the product; and
    causing a display of the at least one identifier of the product and the estimated current inventory of the product on a user device.

7. The method of claim 1, wherein each of the at least one seed inventory heuristic is any of: a type of the product, a time of day, a sales trend of the product, a pattern of the product, sales of the product by other stores, a sales trend of an associated product related to the product, a promotion, an external event, and a location of the store.

8. The method of claim 7, further comprising:
detecting a purchase transaction by a transacting store of the least one store; and
upon detecting the purchase transaction, generating an updated estimated current inventory for the transacting store based on the estimated current inventory of the transacting store and the purchase transaction.

9. The method of claim 1, wherein the distribution data includes a quantity of the product delivered to at least one geographic area.

10. The method of claim 9, wherein each seed inventory is further determined based on relative sizes of stores in each of the at least one geographic area.

11. The method of claim 1, wherein generating an estimated current inventory of the product further comprises:
applying a statistical model to the at least one seed inventory heuristic based on the respective seed inventory.

12. The method of claim 11, wherein each generated estimated current inventory level is further based on a time elapsed since determination of the respective seed inventory.

13. The method of claim 1, further comprising:
determining, for each store, whether the estimated current inventory level is below a threshold; and
upon determining that at least one estimated current inventory level is below a threshold, generating an alert for each store having an estimated current inventory level below the threshold.

14. The method of claim 1, wherein the estimation of the current inventory is performed by a system that is not communicatively connected to the store.

15. The method of claim 1, wherein the seed inventory of the product is implicitly determined.

16. The method of claim 1, further comprising:
generating inventory analytics based on the inventory estimated over time.

17. The method of claim 16, wherein the inventory analytics include sales trends and sales patterns related to at least one of: a specific product, a group of products, a specific store, and a group of stores.

18. The method of claim 1, wherein the product includes any one of: goods, and services.

19. A non-transitory computer readable medium having stored thereon instructions for causing one or more processing units to execute the method according to claim 1.

20. A system for managing inventory of a product in at least one store with respect to a listing of the product on an electronic commerce (e-commerce) website, comprising:
a processing unit; and
a memory, the memory containing instructions that, when executed by the processing unit, configure the system to:
determine, for each store, a seed inventory of the product based at least on distribution data for the product; and
generate, for each store, an estimated current inventory of the product based on the respective seed inventory and at least one seed inventory heuristic determined based on information maintained by entities other than a vendor of the product; and causing the display of information regarding the estimated current inventory to a virtual point of sale (POS) on a user device.

21. The system of claim 20, wherein the system is further configured to:

compute, for each store, at least one probability that the store has at least one quantity of the product in stock based on the estimated current inventory, wherein each probability corresponds to a quantity of the at least one quantity.

22. The system of claim 21, wherein the system is further configured to:
select at least one of the computed probabilities; and
send the selected at least one computed probability.

23. The system of claim 22, wherein the at least one estimated current inventory is selected based on preferences of a consumer.

24. The system of claim 23, wherein the consumer preferences include any of: favoring closer stores, and favoring stores that have higher probabilities of having a requested quantity of the product in stock.

25. The system of claim 22, wherein the system is further configured to:
identify at least one identifier of the product; and
cause a display of the at least one identifier of the product and the estimated current inventory of the product on a user device.

26. The system of claim 22, wherein each of the at least one seed inventory heuristic is any of: a type of the product, a time of day, a sales trend of the product, a pattern of the product, sales of the product by other stores, a sales trend of an associated product related to the product, a promotion, an external event, and a location of the store.

27. The system of claim 26, wherein the system is further configured to:
detect a purchase transaction by a transacting store of the at least one store; and
upon detecting the purchase transaction, generate an updated estimated current inventory for the transacting store based on the estimated current inventory of the transacting store and the purchase transaction.

28. The system of claim 20, wherein the distribution data includes a quantity of the product delivered to at least one geographic area.

29. The system of claim 28, wherein each seed inventory is further determined based on relative sizes of stores in each of the at least one geographic area.

30. The system of claim 20, wherein the system is further configured to:
apply a statistical model to the at least one seed inventory heuristic based on the respective seed inventory.

31. The system of claim 30, wherein each generated estimated current inventory level is further based on a time elapsed since determination of the respective seed inventory.

32. The system of claim 20, wherein the system is further configured to:
determine, for each store, whether the estimated current inventory level is below a threshold; and
upon determining that at least one estimated current inventory level is below a threshold, generate an alert for each store having an estimated current inventory level below the threshold.

33. The system of claim 20, wherein the estimation of the current inventory is performed by a system that is not communicatively connected to the store.

34. The system of claim 20, wherein the seed inventory of the product is implicitly determined.

35. The system of claim 20, wherein the system is further configured to:
generate inventory analytics based on the inventory estimated over time.

36. The system of claim 35, wherein the inventory analytics include sales trends and sales patterns related to at least one of: a specific product, a group of products, a specific store, and a group of stores.

37. The system of claim 20, wherein the product includes any one of: goods and services.

* * * * *